H. A. KNABE.
RECOVERING COMPONENTS OF EXHAUSTED DRY BATTERY CELLS.
APPLICATION FILED DEC. 24, 1918.
1,366,082.
Patented Jan. 18, 1921.
2 SHEETS—SHEET 1.
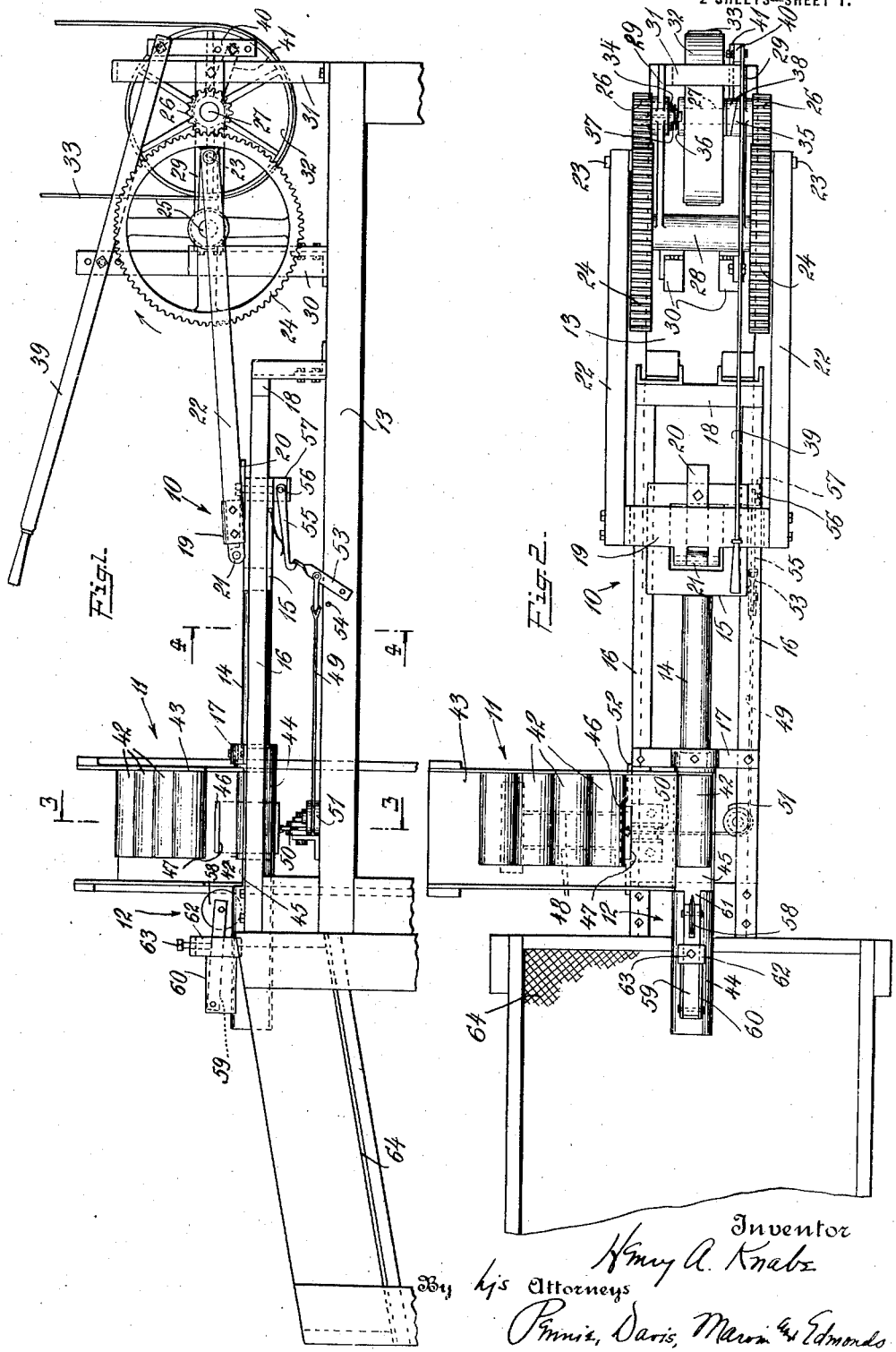
Inventor
Henry A. Knabe
By his Attorneys
Pennie, Davis, Marvin & Edmonds

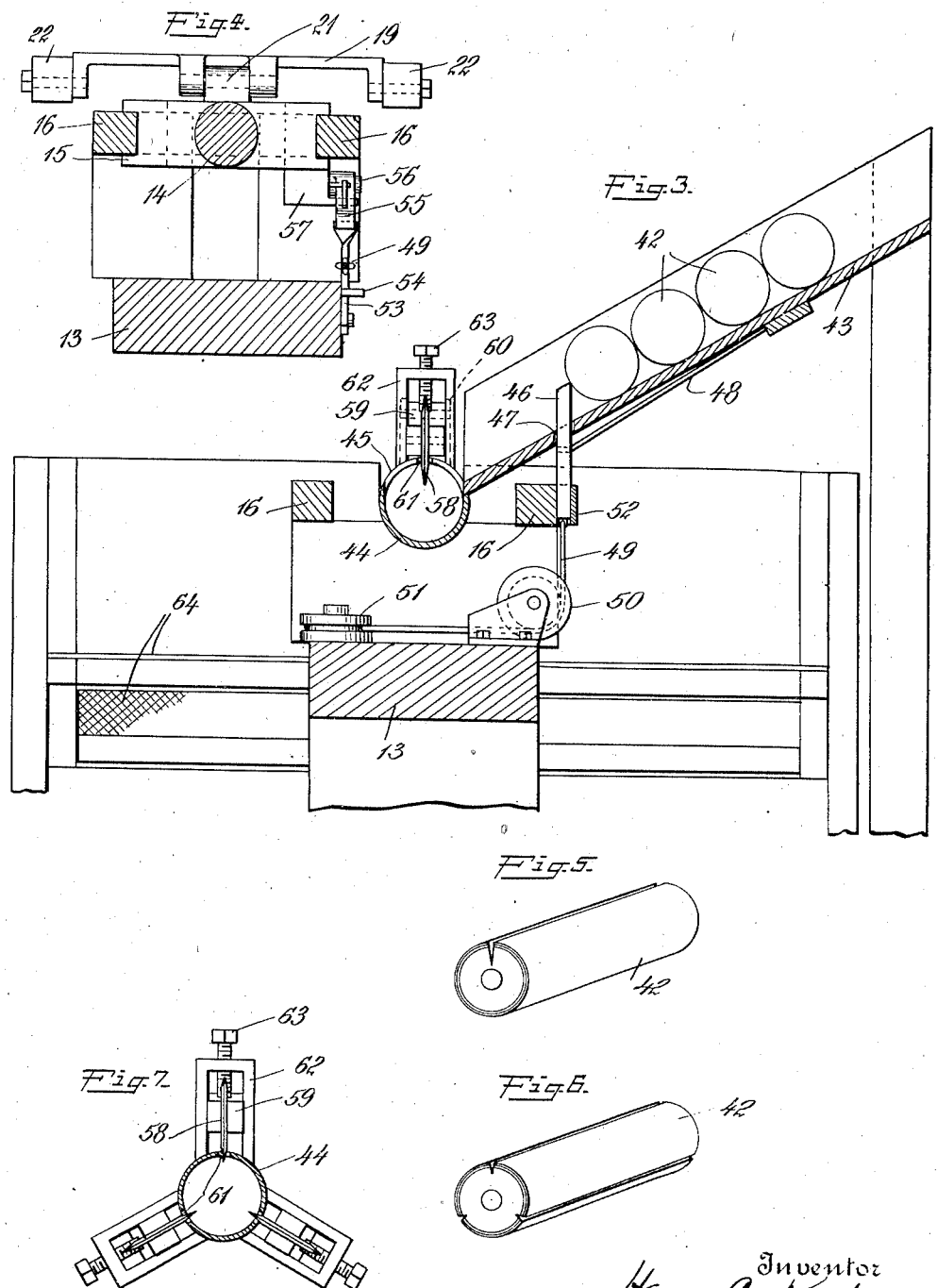

UNITED STATES PATENT OFFICE.

HENRY A. KNABE, OF MADISON, WISCONSIN, ASSIGNOR TO BURGESS BATTERY COMPANY, OF MADISON, WISCONSIN, A CORPORATION OF WISCONSIN.

RECOVERING COMPONENTS OF EXHAUSTED DRY-BATTERY CELLS.

1,366,082.  Specification of Letters Patent.  Patented Jan. 18, 1921.

Application filed December 24, 1918. Serial No. 268,187.

*To all whom it may concern:*

Be it known that I, HENRY A. KNABE, a citizen of the United States, residing at Madison, in the county of Dane, State of Wisconsin, have invented certain new and useful improvements in Recovering Components of Exhausted Dry-Battery Cells; and I do hereby declare the following to be a full, clear, and exact description of the invention, such as will enable others skilled in the art to which it appertains to make and use the same.

The present invention relates to the recovery of the components of exhausted dry battery cells; and it comprehends certain improvements hereinafter fully described, whereby the opening of the cells preliminary to the separation and recovery of their different components may be carried out with the aid of mechanical means or devices, and with minimum trouble and loss of materials through intermingling.

In recovering materials from dry cells, it is necessary to make as complete a separation of the various components as possible, since each is subsequently treated according to its individual needs. The outside paper carton can be removed from the zinc can or electrode and used for pulp, and the electrode can be melted down into metallic zinc; the pulp board lining inside of the zinc can can be separated therefrom and treated to release the chemicals impregnated in it; and the pitch seal, the carbon rod, the filler or mix, the electrolyte, and the post and other metal parts can likewise be segregated and put to useful ends.

This invention comprehends the slitting of the cells automatically in a simple and expeditious manner by means of improved apparatus which is itself readily installed and operated. According to the invention, the cells are forced, one at a time, through a tubular element which is provided with one or more cutters serving to slit the cell in a direction parallel to its axis and capable of adjustment in order to regulate the depth of the cut, thus enabling the cell to be cut practically to the center carbon, irrespective of the size thereof, or merely through the paper and zinc can, or to any degree between these limits. Automatic feeding means are preferably provided, which may be, and preferably are, actuated by the plunger mechanism that serves to force the cells through the cutter carrier, so that each time the plunger is retracted, a new cell will be deposited in position to be engaged by the plunger upon its succceeding forward stroke.

Other and further improved features will be brought out as the description proceeds; but it is to be understood that no limitation to the precise details of the present disclosure is contemplated, since modifications and changes may well be made within the scope of the invention as subsequently claimed, and it is also to be understood that parts of the invention may be used without others, and in different environments.

In the accompanying drawings:

Figures 1 and 2 are, respectively, a side elevation and a plan view of a cell slitting and feeding apparatus embodying the invention;

Figs. 3 and 4 are enlarged, transverse sections taken, respectively, on lines 3—3 and 4—4, Fig. 1;

Fig. 5 is a perspective view of a cell having a single slit therein;

Fig. 6 is a similar view of a cell having three slits, and

Fig. 7 is a detail view of the three-cutter arrangement.

Referring more particularly to said drawings, 10 indicates generally the main or plunger-operating mechanism 11 the cell-feeding mechanism, and 12 the cutting mechanism. These three mechanisms are mounted on the framework 13 of the apparatus, and the first of them consists primarily of a reciprocating, horizontal plunger 14 which is here shown as secured to a carriage 15. The latter is designed to travel forward and backward along an elevated support or track 16, the side members of which are connected by front and rear cross-pieces 17 and 18.

The aforesaid carriage 15 may be actuated in any desired manner, and in the present instance is connected with a reciprocating cross-head 19 by means of a strap 20, which is hinged at its front end to the cross-head, as indicated at 21, and fastened at its rear end to the rear member of the carriage, so that the cross-head is capable of a risingand-falling pivotal or swinging movement relative to the carriage. The ends of the cross-head have secured to them, in turn, the front ends of a pair of spaced connecting bars or pitmen 22, pivotally mounted at their rear ends on crank pins 23 that project laterally outward from a pair of gear wheels 24 loose on the ends of a horizontal cross-shaft 25, whence the necessity for the hinge connection between the cross-head and the carriage. The gears 24 mesh with and are driven by a pair of relatively small gears 26 fixed to the ends of a second cross-shaft 27, which is arranged in rear of shaft 25, the two shafts 25 and 27 being supported in an auxiliary frame which is itself fastened upon the main frame 13. This auxiliary frame may comprise a front member 28, in the form of a sleeve wherein shaft 25 is journaled, a pair of side members 29 extending rearwardly from said sleeve, and front and rear brackets 30 and 31 mounted on the main frame and connected, respectively, to the said sleeve and the rear ends of the side members 29. The rear shaft 27 carries a driving pulley 32, connected by a belt 33 with a suitable source of power, and passes at its ends through a pair of collars 34 and 35, the former of which constitutes the hub of the adjacent gear 26 and is journaled in one of the side members 29, while the other collar is fixed in the other side member 29.

To effect the operation of the carriage, the collar 34 is formed as a clutch member to engage a clutch member 36 on the adjacent end of the hub of the pulley, the latter being loose on its carrier shaft 27 and normally held in inactive position with its clutch member 36 disengaged from the clutch collar 34 by means of an interposed spring 37. The pulley is shifted bodily toward the clutch collar in order to couple the two clutch parts, the shifting means being here shown as consisting of a wedge collar 38 interposed between the other end of the pulley hub and the collar 35 for coöperation with the latter, which is likewise of wedge form, the collar 38 being rotatably mounted on shaft 27, so that when turned in the proper direction it will exert a pushing action on the pulley. Rotation of collar 38 may be effected by means of a centrally-fulcrumed lever 39, or equivalent device, mounted on an extension of one of the brackets 30 and connected by a depending link 40 with an arm 41 provided on said collar, the lever being depressible, in the construction illustrated, in order to bring about the required action.

The feeding mechanism 11 for the battery cells 42 is located immediately in advance of the front cross-piece 17 of the track 16, and comprises an inclined chute 43 along which the cells roll into position to be acted on by the plunger 14 and the cutting mechanism 12, and a device for controlling the feed movement of said cells into such position. At the foot of the chute 43, there is disposed, longitudinally of the main frame 13 and the track 16, a tubular member 44, which also constitutes an element of the cutting mechanism, this member having an internal diameter which is slightly greater than that of the plunger, which latter has substantially the same diameter as the cells. The aforesaid tube and the plunger are arranged in axial alinement, as shown, so as to enable the latter to move inward and outward in the former, the tube having the rear portion of its upper surface cut away to provide an opening 45, through which the cells fall one at a time directly from the chute. The tube may be supported in any desired manner, as will be understood, its rear end being secured, for example, to the cross-piece 17 and its front end to one of the cross-ties of the main frame.

The means for controlling the feed of the cells to the opening in the tube 44 is preferably automatic in its character and connected to be operated by the plunger mechanism, the arrangement being such as to permit a cell to fall through the aforesaid opening substantially at the moment when the plunger reaches the limit of its rearward movement. In the present embodiment of the invention, this device comprises a vertical gate 46, which works through a slot 47 in the chute and is normally held in raised position by a spring 48, so as to check the downward movement of the cells along the chute. To permit such movement, however, it is only necessary to lower the gate through its guide slot, as will be understood, this operation being preferably automatic, as previously stated, though it can, of course, be effected manually. In either case, the means for lowering the gate may advantageously comprise a cable or other flexible element 49, which is fastened to the lower end of the gate and then led across guide pulleys 50 and 51 toward the rear portion of the track 16, the gate preferably working in a guide 52 provided on the adjacent rail of said track directly beneath the slot 47. The rear end of the cable 49 is connected to a lever 53 which is pivoted to the frame 13 and is normally held against a stop pin 54, due to the upward pressure exerted upon the gate by the spring 48. This lever may be utilized as an operating device or handle for retracting the cable manually; but when the action is automatic, as in the present instance, its twisted or bent upper terminal is engageable by the hooked forward end of a catch 55, the engagement taking place during the rearward stroke of the plunger. Catch 55 is attached to the carriage 15, and is preferably mounted on a pin or shaft 56, fitted in a lug 57 on the under surface of the carriage, either the pin or the catch being capable of a slight turning or rocking movement to compensate for the different positions assumed by the lever 53 during its actuation. The parts are shown in Fig. 1 with the carriage at the limit of its rearward movement, at which time the lever 53 has been pulled backward by the catch 55 far enough to lower the gate and permit the lowermost cell to drop through the opening 45 into the tube 44. As soon as the carriage starts to move forward, the spring 48 will tend to raise the gate, and it may here be stated that the movements of the carriage and, hence, of the gate, are sufficiently rapid to preclude more than one cell being fed at a time to the tube. The catch and lever remain engaged as the forward movement of the carriage continues, until the lever comes into contact with the stop pin 54, whereupon its movement is arrested, with the result that the catch then becomes disengaged therefrom. When the carriage again moves rearwardly, the catch will ultimately pick up the lever and pull it backward, thereby causing the delivery of a second cell to the tube.

The cutting mechanism 12 is mounted on the front portion of the tube 44, and comprises one or more cutters 58, here shown as of the disk type. Each cutter is mounted for rotation on the free end of a carrier bar 59, which is pivoted at its other end in a housing 60, the cutter projecting through a slot 61 forming a continuation of the opening 45. Means are provided for limiting the spread of said cutter mechanism or the outward movement of said disks and for rigidly holding said disks to their work during the cutting, for at the rear end of each housing is located a guide 62 in the form of a U-shaped bracket, the connecting portion of which carries an adjusting screw 63 adapted to contact with the carrier bar 59, so as to act as an adjustable stop and regulate the depth of the cut by regulating the spread or outward movement of said disks. When the carriage commences its forward stroke, the plunger 14 will engage the cell in the tube and force it through said tube and into contact with the cutter or cutters, according as one or more may be employed, whereby the cell is slit longitudinally to the depth previously determined by the adjustment of the screw or screws 63. The tube 44 extends forwardly beyond the frame 13, and overhangs a screen 64, onto which the slit cells fall on leaving the tube. But instead of being forced entirely out of the tube by the direct action of the plunger, the cell is actually ejected by the next cell during the slitting operation. The action of the cutters has the effect of cracking or loosening the pitch around the cell, so that a large part of it falls out immediately and can be collected at the mouth of the tube when the cell is ejected, the cutters also slitting the zinc bottom of the cell and thus rendering it possible to open the cell easily by hand and flatten out the zinc prior to carrying out the other separating operations previously mentioned. The provision of the screen enables the sand and sawdust under the pitch to be separated from the latter.

The invention, its mode of operation, and its advantages are believed to be apparent from the foregoing, further description and explanation thereof being accordingly omitted.

I claim as my invention:

1. An apparatus for opening exhausted dry battery cells, comprising a plurality of frictionally driven disks for slitting the cells by a plurality of cuts in the direction of their axes, means for rigidly holding said disks to their work and means for producing a relative movement between the cells and the slitting disks to subject the former to the action of the latter.

2. An apparatus for opening exhausted dry battery cells, comprising mechanism for slitting the cells by a plurality of cuts in the direction of their axes, said mechanism embodying frictionally driven cutters which are adjustably mounted to regulate the depth of the cuts and are rigidly held to their work during the cutting.

3. An apparatus for opening exhausted dry battery cells, comprising, in combination, cell slitting disks, means for feeding the cells one after another to a predetermined position in proximity thereto, stops limiting outward movement of said disks and a plunger for forcing the cells through said cell slitting mechanism.

4. An apparatus for opening exhausted dry battery cells, comprising, in combination, cell-cutting mechanism, means for feeding the cells to a predetermined position in proximity thereto, means for controlling the feed, means for directly and positively subjecting the cells, on reaching such position, to the action of the cutting mechanism, and means automatically operated by the last-named means for actuating the controlling means.

5. An apparatus for opening exhausted dry battery cells, comprising, in combination, a cutter mechanism frictionally driven by the zinc can to be cut, stops limiting the spread of said cutter mechanism and reciprocating means for automatically forcing the cells one at a time through said cutter mechanism.

6. An apparatus for opening exhausted dry battery cells, comprising cell-slitting mechanism, means for directly and positively subjecting the cells to the action of said slitting mechanism, means for feeding said cells to the first-named means, and a gate connected to be automatically operated by said first-named means for controlling the feed.

7. An apparatus for opening exhausted dry battery cells, comprising cell-slitting mechanism, means for directly and positively subjecting the cells to the action of said slitting mechanism, an inclined chute for feeding the cells to said means, a gate for controlling the movements of said cells along said chute, and means for automatically withdrawing said gate at predetermined intervals.

8. An apparatus for opening exhausted dry battery cells, comprising cell-slitting mechanism, a reciprocating device for directly and positively forcing the cells therethrough, means for feeding the cells to said device, and means automatically operated by said device for controlling the feed to present the cells one at a time to the action of said reciprocating device.

9. An apparatus for opening exhausted dry battery cells, comprising cell-slitting mechanism, a reciprocating device for forcing the cells therethrough, means for feeding the cells to said device, means for controlling the feed, an operating lever for said controlling means located adjacent said reciprocating device, a flexible element connecting said controlling means to said operating lever, and means carried by said reciprocating device for engagement with said lever to actuate the same.

10. An apparatus for opening exhausted dry battery cells, comprising cell-slitting mechanism, a reciprocating device for forcing the cells therethrough, an inclined chute for feeding the cells to said device, a gate for controlling the movement of the cells along said chute, a lever connected to withdraw said gate when swung in one direction, and means carried by said reciprocating device to periodically engage said lever and swing it in such direction.

11. An apparatus for opening exhausted dry battery cells, comprising a cylinder open at both ends, a rotary cutter extending into the bore of said cylinder and arranged with its blade parallel with the axis thereof, and means for sliding a cell endwise through said bore so as to be slit by said cutter.

12. An apparatus for opening exhausted dry battery cells, comprising a tubular element open at both ends, a cutter bar pivotally mounted upon said element, a cutter carried by said bar and projecting into the bore of said element, means for forcing a cell endwise through said bore so as to be slit by said cutter, and an adjustable stop engageable with said bar to regulate the depth of the cut.

13. An apparatus for opening exhausted dry battery cells, comprising a tubular element having both ends open and a feed opening in its top, a cutter mounted upon said element and projecting into the bore thereof, means for feeding a cell through said opening into said bore, and a plunger projecting into one end of said bore to force the cell endwise therethrough to be slit by said cutter.

14. An apparatus for opening exhausted dry battery cells, comprising a tubular element having both ends open and a feed opening in its top, a cutter mounted upon said element and projecting into the bore thereof, a chute for feeding cells through said opening into said bore, means for controlling the movement of the cells along said chute, mechanism including a plunger projecting into one end of said bore to force a cell therein endwise therethrough to be slit by said cutter, and means operated automatically by said mechanism for actuating said controlling means.

In testimony whereof I affix my signature.

HENRY A. KNABE.